(12) United States Patent
McCormick et al.

(10) Patent No.: US 10,572,372 B2
(45) Date of Patent: Feb. 25, 2020

(54) TESTING PROGRAM CODE CREATED IN A DEVELOPMENT SYSTEM

(71) Applicant: INTERNATIONAL BUSINESS MACHINES CORPORATION, Armonk, NY (US)

(72) Inventors: Timothy McCormick, Winchester (GB); Alexander D. S. Mirski-Fitton, Winchester (GB); Edwin P. J. Moffatt, Southampton (GB); Ross B. Pavitt, Headley (GB)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/076,373

(22) Filed: Nov. 11, 2013

(65) Prior Publication Data

US 2014/0165044 A1    Jun. 12, 2014

(30) Foreign Application Priority Data

Dec. 7, 2012   (GB) .................................. 1222017.4

(51) Int. Cl.
*G06F 11/36* (2006.01)
(52) U.S. Cl.
CPC ................................ *G06F 11/3688* (2013.01)
(58) Field of Classification Search
None
See application file for complete search history.

(56) References Cited

U.S. PATENT DOCUMENTS

| | | | | |
|---|---|---|---|---|
| 5,680,586 A * | 10/1997 | Elkins | ............... | G06F 17/30067 703/27 |
| 7,506,312 B1 * | 3/2009 | Girolami-Rose | ......... | G06F 8/71 717/101 |
| 7,761,259 B1 * | 7/2010 | Seymour | ............. | G06F 11/2294 702/182 |
| 7,865,937 B1 * | 1/2011 | White | ................ | G06Q 20/3674 705/67 |
| 2004/0006760 A1 | 1/2004 | Gove et al. | | |
| 2005/0015675 A1 | 1/2005 | Kolawa et al. | | |
| 2005/0114475 A1 | 5/2005 | Chang et al. | | |
| 2007/0061782 A1 * | 3/2007 | Schreiner | .................. | G06F 8/71 717/124 |
| 2007/0168946 A1 | 7/2007 | Drissi et al. | | |
| 2008/0005235 A1 | 1/2008 | Hegde et al. | | |
| 2009/0024627 A1 * | 1/2009 | King | ..................... | G06F 21/554 |
| 2009/0228704 A1 | 9/2009 | De Atley et al. | | |
| 2009/0249071 A1 | 10/2009 | De Atley et al. | | |

(Continued)

OTHER PUBLICATIONS

Shihab, "An Industrial Study on the Risk of Software Changes", 2012, SIGSOFT'12/FSE-20.*

(Continued)

*Primary Examiner* — Wynuel S Aquino
(74) *Attorney, Agent, or Firm* — Yee & Associates, P.C.

(57) ABSTRACT

A processor-implemented method, system, and/or computer program product determines a testing regime for program code created in a development system. A risk factor of a user of the development system is calculated based on information relating to previous activities of the user. The calculated risk factor, which describes a likelihood of the user damaging the development system, is used to determine a testing regime for testing program code.

19 Claims, 4 Drawing Sheets

(56) References Cited

U.S. PATENT DOCUMENTS

| | | | |
|---|---|---|---|
| 2010/0124736 A1* | 5/2010 | Farid | G06Q 10/087 434/307 R |
| 2010/0299305 A1* | 11/2010 | Laxman | G06F 8/71 707/609 |
| 2011/0041120 A1* | 2/2011 | Nagappan | G06F 11/3616 717/126 |
| 2011/0314450 A1* | 12/2011 | Shochat | G06Q 10/06 717/124 |
| 2012/0030654 A1* | 2/2012 | Park | G06F 11/3684 717/124 |
| 2012/0117532 A1* | 5/2012 | Knepper | G06F 8/60 717/101 |
| 2012/0192159 A1 | 7/2012 | Holden et al. | |
| 2012/0284684 A1* | 11/2012 | Michaely | G06F 8/71 717/103 |

OTHER PUBLICATIONS

Hurdugaci, "Aiding Software Developers to Maintain Developer Tests", Mar. 27, 2012, Deft University IEEE (Year: 2012).*
GB Patent Application No. 1222017.4—UK IPO Search Report dated May 14, 2013.
Anonymous, "A Method and System for Developers' Behavior Tracking and Quick Assistance in Collaborative Application Development Environment", Ip.com, IPCOM000201675D, Nov. 18, 2010, pp. 1-14, (Abstract and First Page Only).

\* cited by examiner

TESTING PROGRAM CODE CREATED IN A DEVELOPMENT SYSTEM

This application is based on and claims the benefit of priority from United Kingdom (GB) Patent Application 1222017.4, filed on Dec. 7, 2012, and herein incorporated by reference in its entirety.

BACKGROUND

This invention relates to the creation of computer program code, and more particularly to the testing of computer program code created in a development system.

Computer program code is commonly developed in a collaborative fashion with multiple members of a development group working together to develop the program code of a computer program using a single development system/environment.

For a development group in which the members frequently change and/or there are large differences in the programming experience of the members, it can be difficult to manage the build and program control arrangements. For example, excessive restrictions will frustrate experienced members who frequently access the development system and do not break builds of the program code or introduce errors/bugs. Conversely, inadequate restrictions (i.e. excessive freedom of use) may lead to inexperienced members easily introducing bad or error-prone code which may break a build or functionality of the program code.

It is known to control access privileges to a system based on user-provided credentials. This access control concept requires users to be classified into predefined categories each having an associated risk value. The use of such rigid and pre-defined user categories is inflexible. Defining a larger number of categories introduces finer granularity of access control, but also increases an administrative burden.

It is also known to implement automated testing regimes that are adapted to run more or less tests depending on what areas of a program code have been accessed and/or changed by a user of a development system. However, as mentioned above, such testing regimes can be frustrating for experienced members or inadequate for less-experienced members. Devising an optimal testing regime that is neither too strict nor too lax is difficult and may be limited to the granularity of predefined user categories.

SUMMARY

A processor-implemented method, system, and/or computer program product determines a testing regime for program code created in a development system. A risk factor of a user of the development system is calculated based on information relating to previous activities of the user. The calculated risk factor, which describes a likelihood of the user damaging the development system, is used to determine a testing regime for testing program code.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Embodiments enable a dynamic testing regime to be implemented which is based on previous activities of a user.

It is proposed to take account of a user's previous activities when determining a level of risk posed to program code by the user. Situational conditions and/or attributes of the user's current activities can also be used in determining the level of risk. In other words, probabilistic determination of risk is incorporated into a testing requirements decision so as to enable a program code testing regime to be adapted to various situational conditions.

Embodiments may therefore incorporate real-time, probabilistic determination of risk into a testing regime decision, rather than employing a comparison of fixed attributes of the user which may not accurately reflect the level of risk posed by the user at a particular time.

Figure 1:
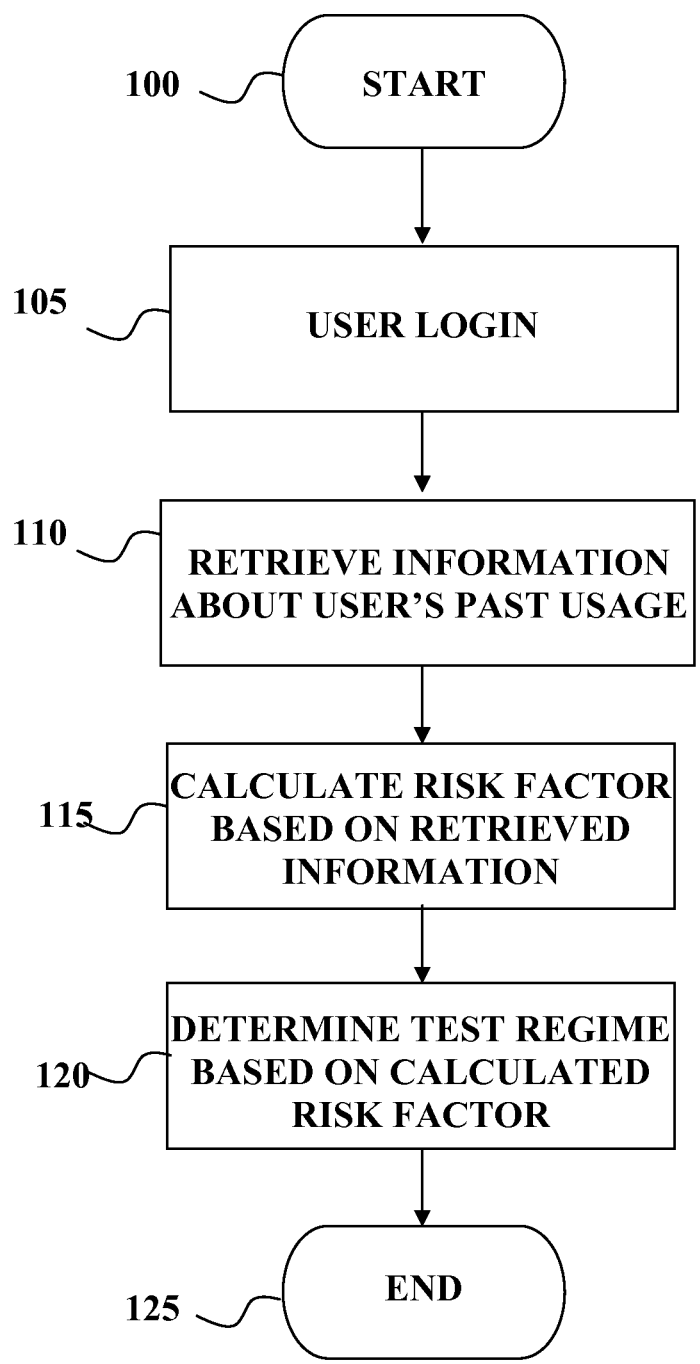
FIG. 1 is a flow diagram of a method of determining a testing regime for program code created in a development system according to an embodiment.

Referring to FIG. 1, there is shown a flow diagram of a method of determining a testing regime for program code created in a development system according to an embodiment.

The method starts in step 100 and proceeds to step 105 in which a member of a software development group (i.e. a user) accesses (or 'logs in' to) a collaborative software development system. As a result of step 105, the user of the development system is identified.

Next, in step 110, information about the identified user's past use of the development system is retrieved from a data store. Such information may comprise information representing detail such as: a system access pattern of the user (e.g. the days and/or times the user typically accesses the system); prior usage of the system by the user; the number of times the user has previously accessed the system; errors caused by the user; areas of the system and/or program code accessed by the user; a previously calculated risk factor for the user; the time elapsed since the user last accessed the system; a size of accessed data (e.g. the number of lines of code changed, the number of files accessed or modified, etc.); a type of operation being performed (e.g. updating an existing file, creating a new file, deleting a file, etc.); and whether previous operation like the current operation have caused rapid successive edits. Such information about the user's prior use of the system may, through appropriate analysis, provide an indication of the user's reliability.

Based on the retrieved information about the user's previous use of the system, a risk factor is calculated in step 115. For example, if the user has not committed many changes to the program code in the past, the user may be considered unknown or untrustworthy and so treated with caution (i.e. considered as being of increased risk). To represent a relative importance of the different types of information in calculating the risk factor, weighting values are assigned to different types of information relating to previous usage of the system.

Other factors may indicate that a user's access to the system imparts an increased or reduced risk of error, such as the time of day, previously committing build-breaking errors or editing parts of code that the users has not worked on before, for example. Accordingly, under specific circumstances, embodiments may calculate that even a user who is highly trusted based on their historical usage poses a high level of risk due to data about their current session, such as an unusual time of day that they are accessing the development system. Also, under other circumstances, embodiments may calculate that a relatively untrusted user poses a low level of risk due to the user accessing a part of code that they have repeatedly worked on before.

A testing regime is then determined, in step 120, based on the calculated risk factor. Here, the testing regime is determined in accordance with a testing policy which defines the preferred levels of testing for different calculated risk factors. For example, the testing policy may specify that all available tests be employed for a very high risk factor and, conversely, specify that no tests be employed for a very low risk factor.

After determining the testing regime in step 120, the method continues to step 125 in which it ends.

Figure 2:
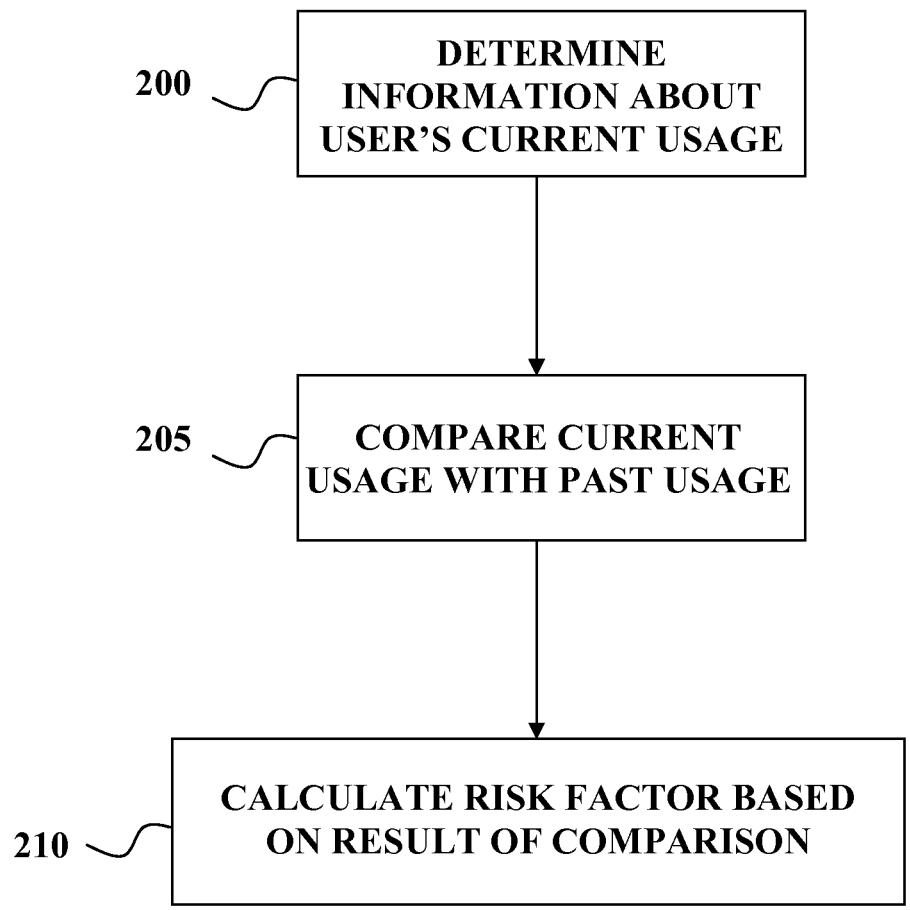
FIG. 2 shows a flow diagram of the step of calculating a risk factor of a user according to an embodiment.

Turning now to FIG. 2, there is shown a flow diagram of the step of calculating a risk factor according to another embodiment. Thus, FIG. 2 shows an alternative to step 115 of the embodiment described above (and shown in FIG. 1).

Firstly, in step 200, information about the user's current use of the development is determined. Such information may include, for example, information representing details such as: the date and/or time; areas of the system and/or program code being accessed by the user; a size of accessed data (e.g. the number of lines of code changed, the number of files accessed or modified, etc); a type of operation being performed (e.g. updating an existing file, creating a new file, deleting a file, etc.); and whether previous operation like the current operation have caused rapid successive edits.

Next, the determined information is compared with information about the user's previous use of the system in step 205. Such comparison of how the user's current use of the system compares with previous use of the system may provide an indication of an increased or reduced risk factor of the user's current access to the system. For example, if the user has always previously accessed the system during normal daytime working hours on weekdays, and the user's current access is late at night or early in the morning during a weekend, the user's current access may be deemed to be unusual and pose a greater risk of error. In such an example, despite the user being trusted and normally having a low risk factor, the comparison may indicate that a greater than normal risk is posed by the user's current access.

Based on the results of the comparison, a risk factor for the user's current access is calculated in step 210. The calculation takes account of a general risk value associated with the user, prior system usage of the user and the current system usage of the user. Thus, calculation of the risk factor in this alternative embodiment is based on both prior system use and current system use of the user.

Figure 3:
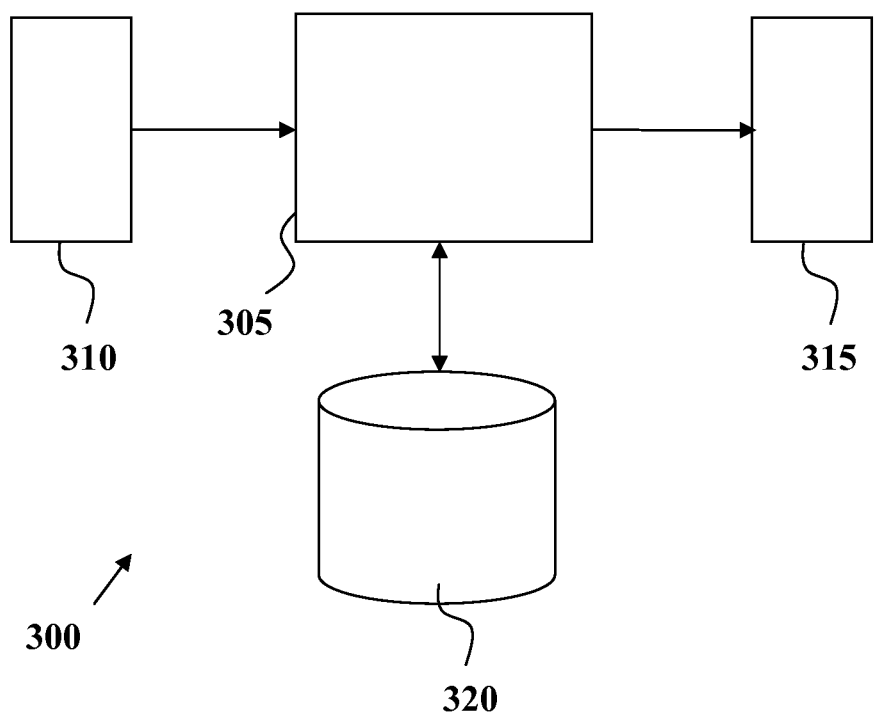
FIG. 3 illustrates a schematic block diagram of a system according to an embodiment of the invention.

Referring now to FIG. 3, there is illustrated a schematic block diagram of a system 300 according to an embodiment. The system 300 is adapted to determine a testing regime for program code created in a development system (not shown). The system comprises a processing unit 305 having input 310 and output 315 interfaces, and a data storage unit 320 connected to the processing unit 305.

The input 310 interface is adapted to receive information about a user access request, and the output interface 315 is adapted to provide information (such as a generated testing, for example) from the processing unit 305 to the development system and/or the user.

The data storage unit is adapted to store information about the user's past use of the development system. Such information may comprise information representing detail such as: a system access pattern of the user (e.g. the days and/or times the user typically accesses the system), the number of times the user has previously accessed the system; errors caused by the user; areas of the system and/or program code accessed by the user; the time elapsed since the user last accessed the system; a size of accessed data (e.g. the number of lines of code changed, the number of files accessed or modified, etc); a type of operation being performed (e.g. updating an existing file, creating a new file, deleting a file, etc.); and whether previous operation like the current operation have caused rapid successive edits. In other words, the data storage unit 320 is adapted to store information relating to previous usage of the development system by the user.

The processing unit 305 is adapted to execute a computer program which, when executed, causes the system to implement the steps of a method according to an embodiment, for example the steps as shown in FIG. 1.

The processing unit 305 is adapted to receive, via the input interface 310, an indication of a user accessing the development system. Based on this indication, the processing unit 305 can check to see if information relating to the user's previous usage of the development system is stored in the data storage unit 320. If such information is not stored, the processing unit may prompt the user (via the output interface) to supply such information. The user may then input such information via the input interface 310 for use by the processing unit 305 and/or storage in the data storage unit 320.

Alternatively, if no history is present for the current user, the actions could be compared to an 'average' profile built based on an aggregation of the usage of all previous users of the system. An additional penalty could be applied to this to indicate that the profile lacks historical backing and the user therefore poses a higher risk.

Using information relating to the user's previous usage of the development system, the processor 305 calculates a risk factor associated with the user's access to the development system. More specifically, the processor analyzes the information relating to the user's previous usage of the development system to determine a level of risk posed by the user.

The processor 305 then determines a testing regime based on the calculated risk factor. More specifically, the processor 305 of this embodiment determines a testing regime in accordance with a predefined testing policy which designates preferred amounts of testing for various risk factors.

The testing regime is provided from the processor 305 to the development system via the output interface 315. In alternative embodiments, the processor may provide information about the determined testing regime to a user via the output interface 115.

Thus, the processor 305 is adapted to dynamically create a tailored and automated testing regime that accounts for the risk posed by the user to the development system based on previous usage of the user. Thus, the testing regime may be automatically implemented before a user's activities are implemented or committed to program code, for example.

Figure 4:
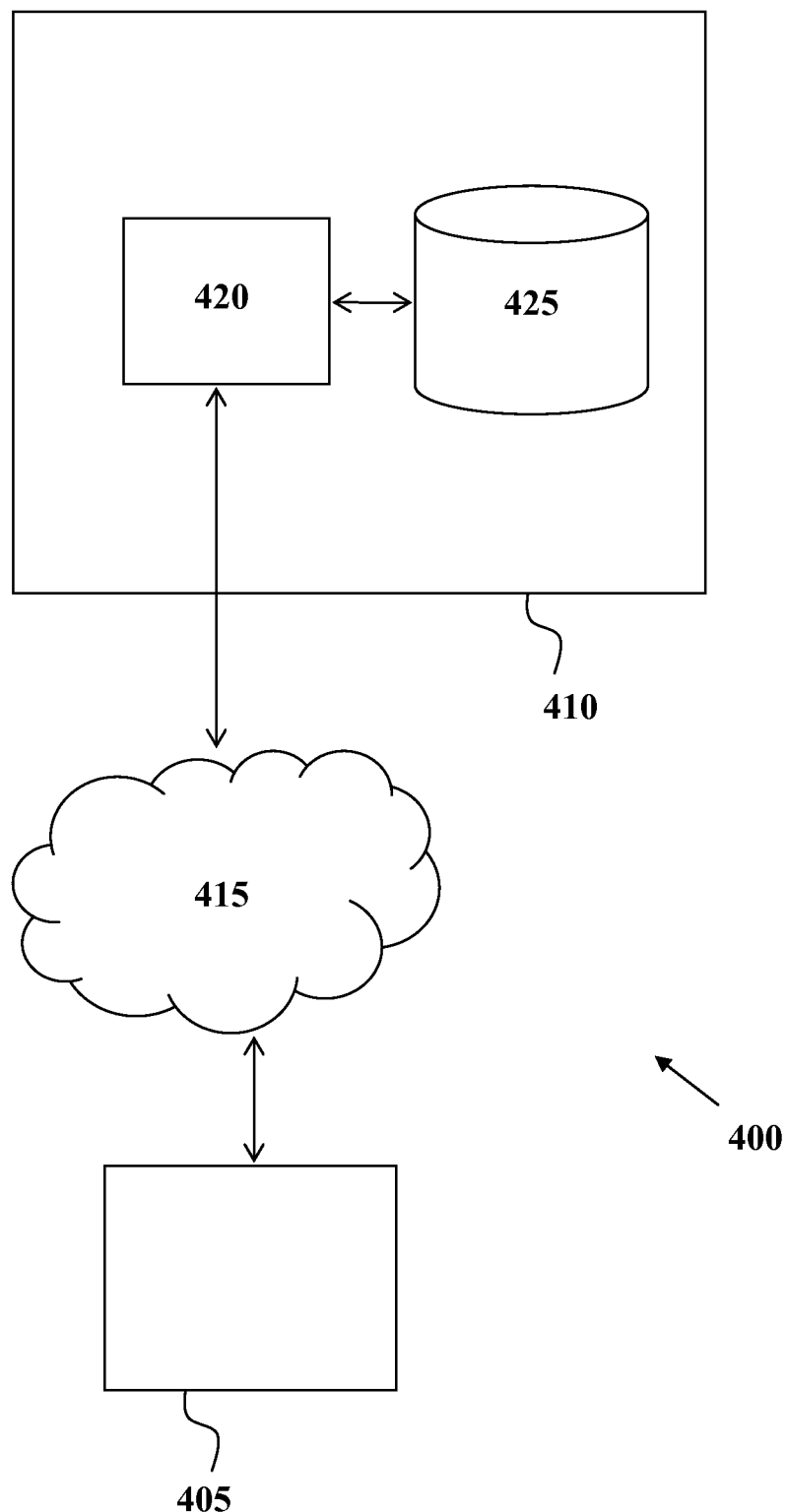
FIG. 4 illustrates a schematic block diagram of a system according to another embodiment of the invention.

Referring now to FIG. 4, there is illustrated a schematic block diagram of a development system 400 according to an embodiment. The development system 400 is adapted to determine a testing regime for program code created in a development system. The system comprises a portable device 405 and a server 410. The portable device 405 is adapted to communicate with the server 410 via a communication link 415 (such as the Internet, for example).

The portable device 405 comprises a program code authoring tool/program which is adapted to enable a user to access a program code development environment hosted by the server 410. The portable device 405 is adapted to communicate user inputted information to the server 410 via the communication link 415.

The server comprises a central processing unit 420 and a data store 425 which stores information about a user's past and current access to the program code development environment hosted by the server 410.

The central processing unit 420 of the server 410 is adapted to analyze the stored information to calculate a risk factor for a user of the a program code development environment and determine a testing regime for program code created, accessed or modified by the user. The central processing unit 420 then provides the testing regime to the portable device 405 (via the communication link 415) as a requirement for the user or a testing module to implement. The system 400 is adapted to penalise the user (e.g. prevent their changes from being checked-in, apply a higher risk factor to their future check-ins, or even prevent further access to the program code development environment for a set time or until the restriction is lifted by an administrator) if the user does not implement the testing regime or if the testing module determines that the user's activities testing regime have failed the testing regime.

Embodiments may be captured in a computer program product for execution on the processor of a computer, e.g. a personal computer or a network server, where the computer program product, if executed on the computer, causes the computer to implement the steps of a method according to an embodiment, e.g. the steps as shown in FIG. 1. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, memory card, network-area storage device, Internet-accessible data repository, and so on, may be considered.

Various modifications will be apparent to those skilled in the art.

For example, checks on historical usage may use both an individual user's usage history and also the accumulated usage of all users of the system. This accumulation may allow improved calculation of a risk factor. By way of example, it may be considered a different risk if: (a) many users worked weekends and a new user does a weekend commit; (b) no user has ever worked weekends and a new user does a weekend commit. Another example might be that even if a single user always makes good changes to a particular area, if that area is inherently risky (i.e. lots of other users make bad updates there) then it should perhaps still command a higher risk factor even for a "safe" user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

As described herein, according to an aspect of the invention there is provided a method of determining a testing regime for program code created in a development system, the method comprising the steps of: calculating a risk factor of a user of the system based on information relating to previous activities of the user; and determining a testing regime for testing program code based on the calculated risk factor of the user.

Thus, there is proposed a concept for determining testing requirements which takes into account a risk of user error and recognises that previous activities (such as prior usage of a development system, for example) may be indicative of the level of risk posed by the user. A testing regime can therefore adapt to varying usage conditions in accordance with a testing policy, the testing policy defining what level of testing is preferred based on one or more risk levels associated with such conditions.

Embodiments enable a dynamic testing regime to be implemented which is based on previous system usage of a user or other users. Information relating to the user's current activities (such as current usage of the system, for example) may be determined, and the step of calculating a risk factor may be further based on the determined information relating to the user's current activities, or how they relate to other users of the system. By comparing current activities of the user with previous activities, a testing regime can be dynamically adjusted to account for a lowered or increased level of risk that is calculated from the comparison. In other words, a testing regime may be adjusted based on past user habits, and may be further based on how current activities compares with previous activities of the user or other users of the system.

The information relating to previous activities of the user may comprise information representing at least one of: a system access pattern of the user; prior usage of the system by the user; the number of times the user has accessed the system; errors caused by the user; areas of the system accessed by the user; a previously calculated risk factor for the user; and time elapsed since the user last accessed the system. Weighting values may be assigned to different types of information so as to represent a relative importance of the information.

A testing regime may be created by selecting one or more program code tests based on the calculated risk factor of the user. Accordingly, under specific circumstances, embodiments may employ a rigorous testing regime for a highly trusted user. Conversely, embodiments may be adapted to relax a testing regime for an untrusted user under circumstances that indicate the untrusted user poses a reduced level of risk.

Embodiments may be used in conjunction with a multi-user development system that is adapted to enable collaborative creation of program code by a plurality of different users. Where multiple users work collaboratively, behaviour of not only a single user, but the collective user group (how each user conforms or differs from the collective behaviour), may be used to enhance the calculation of a risk factor for each action performed.

According to another aspect of the invention there is provided a computer program product for determining a testing regime for program code created in a development system.

According to another aspect of the invention, there is provided a system adapted to determine a testing regime for program code created in a development system.

What is claimed is:

1. A method comprising: calculating, by one or more processors, a risk factor of a user of a development system based on information relating to previous activities of the user with the development system, wherein the risk factor describes a likelihood of the user damaging the development system, and wherein the information relating to previous activities of the user includes time elapsed since the user last accessed the development system; determining, by one or more processors, a testing regime for testing program code based on the calculated risk factor of the user; determining, by one or more processors, whether the user has implemented the testing regime in the development system; and in response to determining that the user has not implemented the testing regime in the development system, preventing, by one or more processors, the user from further accessing the development system in order to prevent damage to the development system by the user: assigning, by one or more processors, weighting values to different types of information relating to previous activities of the user so as to represent a relative importance of the different types of information.

2. The method of claim 1, further comprising:
determining, by one or more processors, information about a current activity of the user, and wherein said calculating the risk factor is further based on the information about the current activity of the user.

3. The method of claim 2, further comprising:
storing, by one or more processors, determined information about the current activity of the user.

4. The method of claim 1, wherein the information relating to previous activities of the user further comprises information representing at least one of:
a system access pattern of the user;
prior usage of the development system by the user; a number of times the user has accessed the development system;
system errors caused by the user;
areas of the development system accessed by the user;
a previously calculated risk factor for the user.

5. The method of claim 1, wherein said determining the testing regime comprises selecting one or more program code tests based on the calculated risk factor of the user.

6. The method of claim 1, wherein the development system is a multi-user system adapted to enable collaborative creation of program code by different users.

7. The method of claim 1, further comprising:
testing, by one or more processors, program code created in the development system by running the testing regime on the program code.

8. The method of claim 1, wherein the information relating to previous activities of the user with the development system is a system access pattern of the user, and wherein the system access pattern describes days and times the user has historically accessed the system.

9. The method of claim 1, wherein the information relating to previous activities of the user with the development system is a number of times the user has previously accessed the system.

10. The method of claim 1, wherein the information relating to previous activities of the user with the development system is a previously calculated risk factor for the user that describes a likelihood of the user damaging the development system.

11. The method of claim 1, wherein the information relating to previous activities of the user with the development system is a time elapsed since the user last accessed the system before said calculating the risk factor occurs.

12. The method of claim 1, wherein the information relating to previous activities of the user with the development system describes types of operations that have been performed by the user, and wherein the types of operations are from a group consisting of updating an existing file and creating a new file.

13. The method of claim 1, wherein the information relating to previous activities of the user with the development system describes types of operations that have been performed by the user, and wherein the types of operations are those that delete a file.

14. The method of claim 1, wherein the information relating to previous activities of the user with the development system is a size of accessed data by the user during past activities, wherein the size of the accessed data describes a number of lines of code changed and a number of files that have been accessed by the user during the past activities, and wherein a low number of lines of code being changed and a low number of files being accessed by the user indicate a high risk factor for the user.

15. The method of claim 1, wherein the information relating to previous activities of the user with the development system describes previous operations that are similar to a current operation being performed by the user, and wherein the previous operations have caused rapid successive edits to other program code.

16. The method of claim 1, wherein the testing regime is determined by a server, and wherein the method further comprises:
transmitting, by one or more processors, the testing regime from the server to a portable computing device for implementing the testing regime on the program code, wherein failure to implement, in the portable computer, the testing regime on the program code prevents the user from accessing a program code development environment provided by the development system for a predetermined amount of time.

17. A computer program product for determining a testing regime for program code created in a development system in order to protect the development system, the computer program product comprising a computer readable storage device, wherein the computer readable storage device is hardware having program code embodied therewith, the program code readable and executable by a processor to perform a method comprising: calculating a risk factor of a user of the development system based on information relating to previous activities of the user, wherein the risk factor describes a likelihood of the user damaging the development system; determining a testing regime for testing program code based on the calculated risk factor of the user; determining whether the user has implemented the testing regime in the development system; and in response to determining that the user has not implemented the testing regime in the development system, preventing the user from further accessing the development system in order to prevent damage to the development system by the user: assigning, by the processor, weighting values to different types of information relating to previous activities of the user so as to represent a relative importance of the different types of information.

18. The computer program product of claim 17, wherein the method further comprises:
determining information about a current activity of the user, and wherein said calculating the risk factor is further based on the information about the current activity of the user.

19. A system comprising: a processor, a computer readable memory, and a computer readable storage medium; first program instructions to calculate a risk factor of a user of a development system based on information relating to previous activities of the user, wherein the risk factor describes a likelihood of the user damaging the development system; second program instructions to determine a testing regime for testing program code based on the calculated risk factor of the user: third program instructions to determine whether the user has implemented the testing regime in the development system; and fourth program instructions to, in response to determining that the user has not implemented the testing regime in the development system, prevent the user from further accessing the development system in order to prevent damage to the development system by the user; and wherein the first, second, third, and fourth program instructions are stored on the computer readable storage medium for execution by the processor via the computer readable memory: assigning, by the processor, weighting values to different types of information relating to previous activities of the user so as to represent a relative importance of the different types of information.

\* \* \* \* \*